United States Patent [19]

Morse

[11] Patent Number: 5,109,315

[45] Date of Patent: * Apr. 28, 1992

[54] SAFETY DEVICE FOR AN ELECTRICAL APPLIANCE

[76] Inventor: Milton Morse, 1 Horizon Rd., Fort Lee, N.J. 07024

[ * ] Notice: The portion of the term of this patent subsequent to Aug. 21, 2007 has been disclaimed.

[21] Appl. No.: 260,453

[22] Filed: Oct. 20, 1988

[51] Int. Cl.⁵ .............................................. H02H 3/16
[52] U.S. Cl. ..................................... 361/42; 307/118; 307/326; 361/45
[58] Field of Search ................... 361/1, 42, 45, 46, 47, 361/48, 49, 50, 178; 307/118, 326

[56] References Cited

U.S. PATENT DOCUMENTS

| | | | |
|---|---|---|---|
| 4,194,231 | 3/1980 | Klein | 361/45 |
| 4,464,582 | 8/1984 | Aragaki et al. | 361/42 |
| 4,687,906 | 8/1987 | Fujishima et al. | 361/42 X |
| 4,706,153 | 11/1987 | Sainomoto et al. | 361/42 X |
| 4,709,293 | 11/1987 | Gershen | 361/42 X |
| 4,791,518 | 12/1984 | Madsen | 307/326 X |
| 4,951,169 | 8/1990 | Morse | 361/42 |
| 4,967,308 | 10/1990 | Morse | 361/42 |

Primary Examiner—Howard L. Williams
Attorney, Agent, or Firm—Arthur L. Plevy

[57] ABSTRACT

A safety device for minimizing electrical shock to a user is taught. Briefly stated, a ground plane is disposed inside an electrical tool or device. Should the device become immersed in water or become unreasonably wet, the plane provides a path of electrical current, which energizes an interrupt device contained therein. The interrupt device disconnects power from the device. Further, reset can only be accomplish by a special purpose tool being urged through an aperture in the device case.

14 Claims, 2 Drawing Sheets

SAFETY DEVICE FOR AN ELECTRICAL APPLIANCE

BACKGROUND OF THE INVENTION

This invention relates, generally, to appliances and, more particularly, to appliances such as electric hair dryers, curling irons, kitchen appliances and the like which include a means for disconnecting the electrical current therein should the device become saturated with water to the point or for any other reason where a shock hazard exits.

The state of consumer appliances in present day households indicate that usage of electrical devices is increasing. There are many types of devices, particularly handheld types, which generally fall into three categories—health and beauty, kitchen and electric hand tools. Health and beauty handheld electrical devices are generally comprised of electric hair dryers, curling irons, electric razors; kitchen devices are generally mixers, blenders, coffee makers, etc.; while handheld electric tools are generally comprised of drills, hedge-clippers, handheld saws and the like.

The reason for the proliferation of these devices is quite simple. They are generally inexpensive to purchase, while being convenient and well adapted to their individual purpose. However, use of these devices produces a distinct danger, particularly when used around water, or even steel wool pads. This danger is in the form of electrocution. Frequency of electrocution as a result of these types of devices, particularly handheld electric hair dryers, is increasing. Since these types of devices are typically used in wet areas, such as by sinks, tubs or outside, it is readily apparent that there is a significant likelihood that the object will either be dropped into water, such as a bathtub or a sink, or that it may become contaminated with water, such as by splashes when clipping shrubbery by moisture which is present on grass, adjacent foundations or the like.

Presently, ground faulting interruptors are being used in new and renovation construction, which are expressly for the purpose of minimizing the chances of electrocution. However, these types of devices have not been integrated into existing housing, which comprises the bulk of usage areas. Hence, safety is a problem from place to place and not merely between devices.

Another significant and distinct disadvantage problem, whether or not conventional ground faulting directors are being utilized, is that fault current must generally flow through the user before the device detects and interrupts the flow of current therethrough. Another disadvantage is in the situation where there are no conventional ground fault interrupters and a separate interrupter is utilized with the device. Generally, conventional ground fault interrupters are somewhat bulky and cumbersome due to the fact that they not only detect and interrupt the flow of ground fault current, but also have user accessible test and reset buttons. This therefore drives up the cost and size requirements of any device wishing to utilize current interruptors.

Accordingly, it is an object of the present invention to provide a current path in a handheld electrical device which allows a current interruption device to operate more quickly.

It is a further object of the present invention to provide a current path in an electrically powered handheld device which avoids leakage current paths through the user of the device.

It is yet another object of the present invention to produce a device which incorporates a current interruption mechanism as an integral part thereof.

Yet another object of the present invention is to produce a handheld electrical device having current interruption integral therein wherein reset, once the device has been tripped, can only be accomplished by a special tool.

A still further object of the present invention is to produce a handheld electrical device having a current interrupting mechanism integral therein which is resettable only after inspection by a trained service person.

Yet another object of the present invention is to produce a handheld electrical device having an interrupting safety mechanism which is inexpensive to manufacture.

Another object of the present invention is to produce a device which adds few additional components and is easy to assemble.

Still a further object of the present invention is to produce a current interruption mechanism which is small and compact and may also fit into existing housing configurations and sizes.

Yet another object of the present invention is to produce a safety device which is retrofittable to existing designs. Such a device is taught by the present invention.

It is another object of the present invention to produce a safety device which will function even when the handheld device is not plugged in.

Finally, another object of the present invention is to produce a device having an electrical path for driving a load therein which comprises a ground plane disposed within the device in order to provide an electrical path, a detector with an input for detecting the presence of electrical current in the ground plane and an output for producing an electrical signal after detection of the presence of electrical current in the ground plane, and a current interruptor which has an input adapted to receive the output of the detector and an output for interrupting the electrical path in the device.

BRIEF DESCRIPTION OF THE DRAWINGS

Reference may now be had to the accompanying drawings in which.

DETAILED DESCRIPTION OF THE PREFERRED EMBODIMENT

Figure 1:
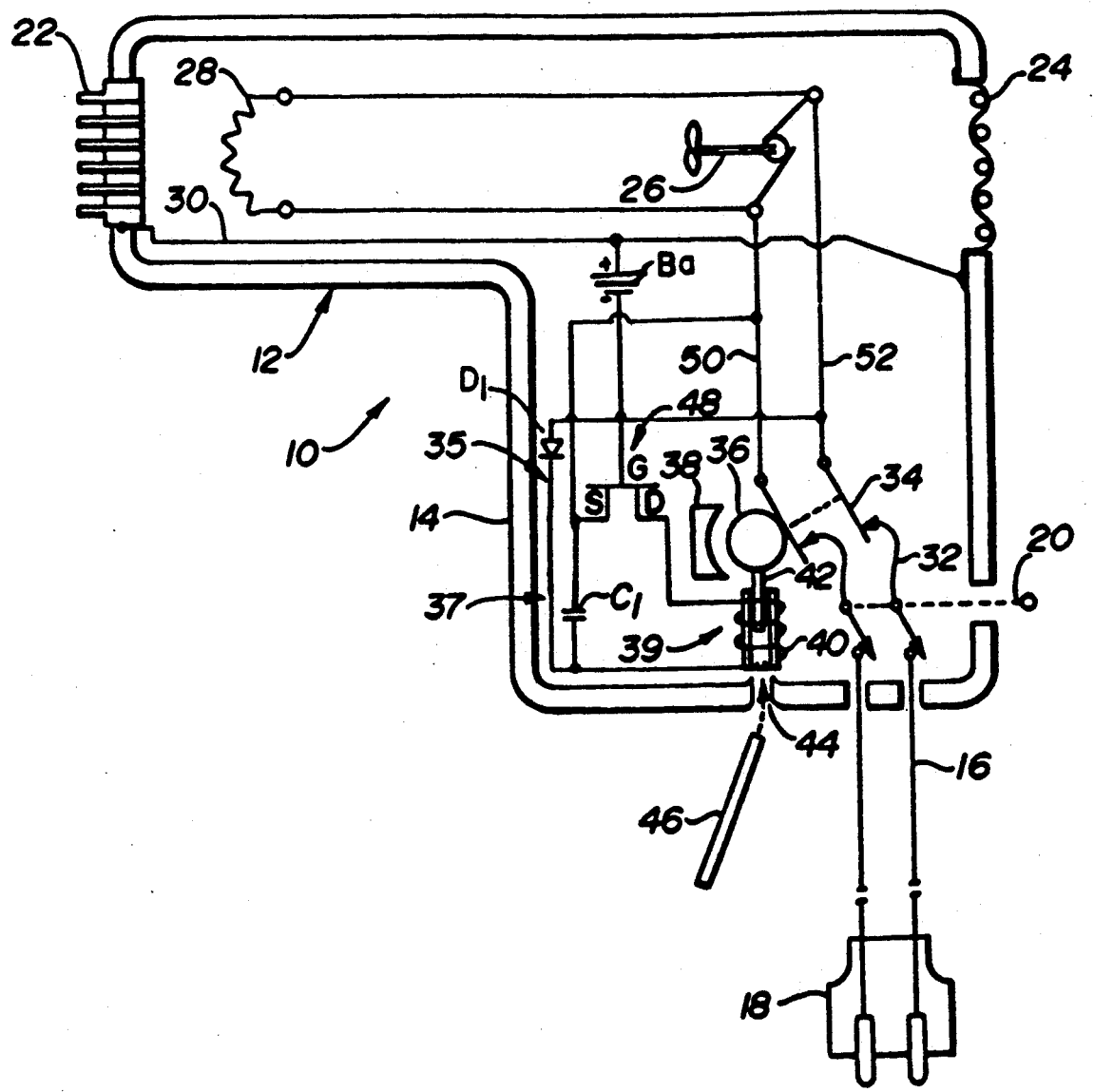
FIG. 1 is a representational view of an electric handheld hair dryer incorporating the present invention.

Referring now to FIG. 1, there is shown a diagrammatic view of the device encompassing the preferred embodiment of the present invention. Shown is an electric handheld hair dryer 10. It is to be understood that other types of handheld electric devices can and may be used without departing from the spirit and scope of the present invention such as, for example, electric curling irons, hand tools and the like. The hair dryer is comprised of a barrel 12 and handle 14 housing a number of components therein. At one end of handle 14 is an electric cord 16 which terminates at plug 18 and is suitable for typical household use. An ON/OFF lever 20 is disposed at the base of handle 14 and may be of any suitable type such as slide, rotary or the like and may be single pole, double pole or any other suitable or desired configuration. At one end of barrel 12 is a front grill 22 which permits the passage of heated air therethrough as described more fully below. A screen 24 is typically located at the rear end of barrel 12 and utilized so that foreign matter, i.e. hair, cannot be sucked into barrel 12. A blower or fan is generally disposed adjacent screen 24 and takes air in through screen 24 and passes air over heating element 28. Heating element 28, in turn, heats the air before the air exits through the front grill 22. A ground screen or plane 30 is used to electrically connect front grill 22 to screen 24. Further, ground screen/plane 30 provides a continuous electrical path throughout the interior of hair dryer 10. By ground screen/plane 30 is meant any electrically conductive means to direct the current to a current interruptor device and, therefore, the ground plane 30 is not necessarily at earth "ground" potential. In this manner, should hair dryer 10 fall into water or should hair dryer 10 become wet to an unacceptable level, a ground path is provided between electrically conductive "live" areas in the hair dryer and the ground screen. The electrical connection between grill and screen 22 and 24 respectively via a ground screen/plane 30 may be accomplished in any number of suitable ways, such as crimp type fits, compression type fits, soldering or welding to mention a few. Any of the live areas can and may include exposed portions of hot or neutral wires 50,52 respectively, portions of heating element 28 or blower motor 26 as well as portions of ON/OFF switch 32 having load contacts 34 therein.

It has been determined that the ground screen/plane 30 may be in a number of embodiments or configurations, although all are acceptable as long as a continuous electrically conductive ground path is provided. Accordingly, the ground screen/plane 30 may be in the form of a metal screen, or plating disposed on the interior portions of hair dryer 10, or on one side of heating insulators (not shown) which are typically disposed in barrel 12, may be fabricated from aluminum or other type of metal foil. In this manner, a current return path is readily available between any of the electrically "live" components inside hair dryer 10 (as previously discussed) through water and hence to ground screen/plane 30. It has been found that this provision of an alternate return or ground path minimizes or eliminates the chance of current flow through a user, particularly when the unit merely has too much water present such as having water splashed on to it as it lies adjacent a sink or, in the case of a hand tool, it is laid down into or adjacent a puddle.

It has been found that the provision of a ground screen/plane 30 provides another distinct and significant advantage in that present hair dryer or appliance design need not be changed from two conductor to three conductor cord sets (not shown) since present designs are most cost sensitive. For this reason I have found that provision of an interrupt device 35, which is contained directly in handle 14, is appropriate. The interrupt device 35 is generally comprised of two portions, an electronic components portion 37 and a mechanical interlock portion 39. The function of the electronic component portion 37 is to detect and utilize electrical energy passing through or present on ground screen/plane 30. The mechanical interlock 39 is used to physically disconnect incoming power via electric cord 16 to the remainder of hair dryer 10.

The electronic components 37 include field effect transistor (FET) 48 having its gate terminal (G) connected to a terminal of biasing battery $B_a$, with the remaining lead of the battery $B_a$ connected to ground screen/plane 30. Therefore, the biasing battery $B_a$ will render the FET 48 to become conductive in the event of any current leakage between ground screen/plane 30 and elsewhere in the device 10. A lithium or hearing-aid type battery $B_a$ (or other long shelf life battery) may be utilized to provide an internal POWER SUPPLY which would cause mechanical interlock 39 to be energized regardless of whether plug 18 has power applied thereto, should the hair dryer be immersed or present a shock hazard or the like. Therefore, when plug 18 is energized, the device would have been previously tripped and no chance of electrical short or the like can be applied to the user.

Source terminal (S) of FET 48 is connected to hot lead 50 and to one terminal of condensor C1. The remaining terminal of condensor C1 is connected to one terminal of coil 40 and to the cathode of diode D1. The remaining terminal of diode D1 is connected to neutral lead 52. The drain terminal (D) of FET 48 is connected directly to the remaining terminal of coil 40.

Coil 40 is preferably a "latch" type solenoid coil having a movable rod 42 disposed therein. In the preferred embodiment of the present invention, movable rod 42 is either an integral part of or connected to ball 36. Therefore, energization of coil 40 causes ball 36 to be urged downward. However, it is to be understood that rather than rod 42 pulling ball 36 downward, similar satisfactory results may be obtained by having rod 42 merely push ball 36 upward. A stop 38 is provided to maintain ball 36 in a stationary position with ball 36 being used to bias spring-type load contacts 34 against appropriate terminals of ON/OFF switch 32. In this manner, when rod 42 is urged downward, due to electromotive force present in coil 40, ball 36 is similarly urged downwards with the result that load contacts 34 will electrically and mechanically disconnect from the contacts of ON/OFF switch 32.

Therefore, when current exists between ground screen 30 and hot wire 50 (or neutral wire 52), current will be permitted to flow through FET 48 with the result that coil 40 will become energized. Accordingly, in the preferred embodiment of the present invention, a ground fault in the traditional sense is not required in order to "trip" the present invention and prevent user injury. Rather, a current between ground screen/ plane 30 and any electrically live component, such as is present a shock hazard, will be detected and will result in operation of interrupt device 35. This shock hazard may be the result of immersion, high humidity, steel wood used during cleaning, or as a result of damage. Such damage may occur when, for example, a user tries to clean a toaster by using a knife and causes a short therein.

In this manner, the "user" is not required to be the return path in a circuit and hence subject to shock before the device will trip. Another significant advantage of a battery in this type of circuit operation is that even if plug 18 is not energized, that is in a receptacle, the battery supplies the power to enable the interrupt device 35 to function. Accordingly, FET 48 and hence coil 42 are in effect "biased" in order to ensure rapid response time. Consequently, when the hair dryer 12 is eventually plugged in, there will be no chance of a shock hazard.

When tripped, rod 42 will, as previously mentioned, preferably be urged downward. Further, in the preferred embodiment of the present invention, rod 42 is of an appropriate length such that after tripping it cannot and will not emerge through reset aperture/keyway 44 present in the underside of handle 14. In the preferred embodiment of the present invention, return of rod 42 to the normal position which enables load contacts 34 to be energized, cannot be accomplished except by use of reset key 46. Accordingly reset key 46 must be passed through reset aperture/keyway 44 in order to properly reorient rod 42. Preferably, keyway 44 and hence reset key 46 are of a cross-type configuration. In this manner, reset may only be accomplished by an individual having the correct reset key. Accordingly, it is preferred that only qualified service individuals be given a reset key, thereby adding an extra level of safety. Should interrupt device 35 trip, the user would be required to bring the device to any service center having qualified technicians who will then examine hair dryer 10 to ensure that the interior is dry, there are no damaged components, frayed wires or extraneous matter or the like, before resetting interrupt device 35.

Additionally, in the preferred embodiment of the present invention, it is preferred that load contacts 34 and ON/OFF switch 32 be at least moisture proof and preferably waterproof. Therefore, should a hair dryer be immersed in water, water cannot flow into the switch 32 which might permit a flow of current through switch 32 to load contacts 34 at any time. Alternately, in the present invention, a reset aperture/keyway may not be utilized with the result that a trained service technician must open up the hair dryer to ensure that they physically inspect the interior thereof and to effectuate reset of mechanical interlock 39.

Further, in the preferred embodiment of the present invention, condenser C1 is an electret which is well known and understood by one skilled in the art. An electret is highly desirable since it retains a charge, absent outside electrical stimulation. In this regard, it is not necessary for condenser C1 to build a charge prior to energization of coil 40. Since the electret retains its own charge, quick energization of coil 40 is inherent. Hence this cuts down significantly on the interrupt time of mechanical interlock 39. This is especially important since electromagnets, such as coil 40, typically have a relatively "long" energization time when viewed in terms of the time required for electrical hazard to an individual. For this reason, a fast acting FET is preferred. Additionally, should it be desired, a transient filter (not shown) may be inserted in series circuit relationship between the source terminal of FET 48 and the electrical connection to the ground screen/plane 30 should nuisance trips be a concern or a problem.

Figure 2:
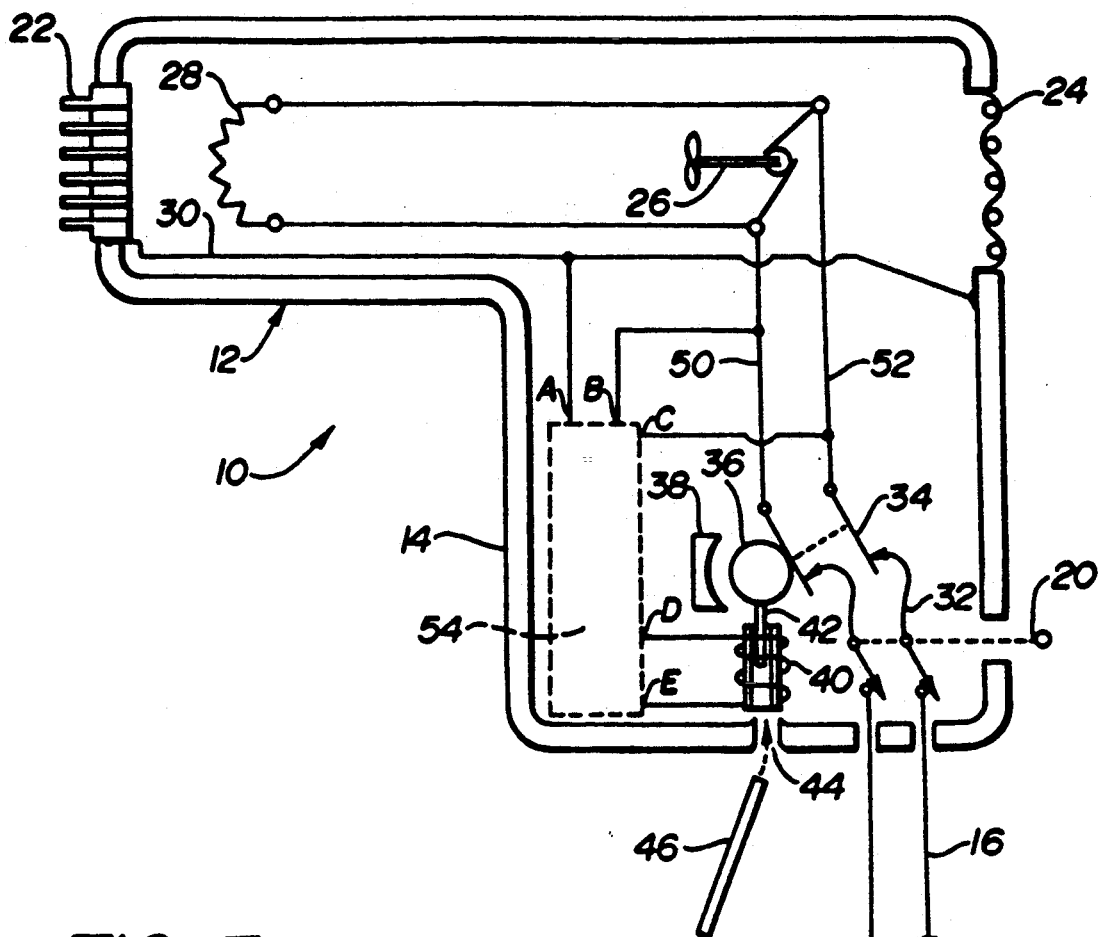
FIG. 2 is a view substantially identical to FIG. 1 illustrating alternate current interruption mechanisms.

Referring now to FIG. 2, a view substantially similar to FIG. 1 is shown. Accordingly, only the differences between FIGS. 1 and 2 will be explained herein. Shown is trigger mechanism 54 which has a number of electrical appliances connected thereto. Ground screen/plane 30 is connected via terminal A to trigger mechanism 54 while similarly terminals D and E of trigger mechanism 54 are respectively connected to coil 40. Terminal B is connected to the hot lead 50 while terminal C is connected to neutral lead 52, although, for the reasons previously mentioned, terminals B and C may be reversed. Accordingly, trigger mechanism 54 may encompass a variety of different components or alternate embodiments.

Figure 3:
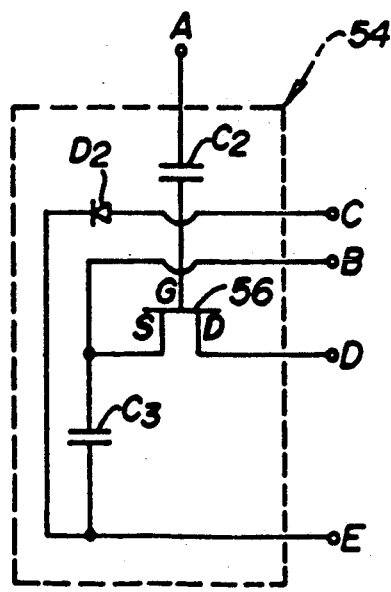
FIGS. 3 and 4 show two alternate circuit configurations for effecting current interruption.
Figure 4:
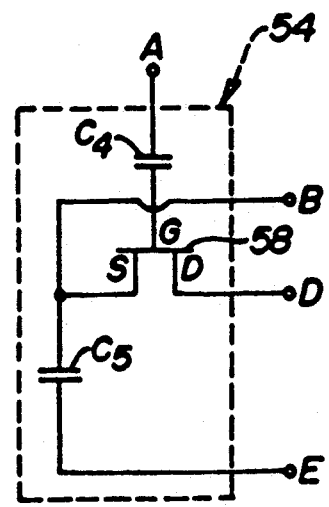

Accordingly, referring now to FIGS. 3 and 4, schematic representations of alternate embodiments of the present invention may be utilized. More particularly, trigger mechanism 54, as shown in FIG. 3, would supplant electronic components 37 disposed in FIG. 1 while similarly trigger mechanism 54 of FIG. 4 would supplant electronic components 37 of FIG. 1. Referring to FIG. 3, terminal A and hence ground screen/plane 30 is connected to one terminal of condenser C2. The remaining terminal of condenser C2 is connected to the gate terminal of FET 56. The drain terminal of FET 56 is connected to terminal D or one terminal of coil 40. Hot lead 50, terminal B, is connected to the source terminal of FET 56 and to one terminal of condenser C3. The remaining terminal of condenser C3 is connected to remaining lead, terminal E for coil 42 and to the cathode of diode D2. The anode of diode D2 is connected to terminal C, neutral lead 52. It is preferred that condensers C2 and C3 be electrets, thereby providing a certain amount of bias to FET 56 and coil 42 for the purpose of decreasing the "trip time" of mechanical interlock 39. Additionally, by connecting to neutral lead 52, one half-cycle of delay time is eliminated since alternating current is utilized and hence lead 52 is at a high potential when lead 50 is at a low potential.

FIG. 4 performs in a manner similar to that of FIG. 3 but is, of course, somewhat simpler. There, terminal A is connected to one terminal of condenser C4 while the remaining terminal of condenser C4 is connected to the gate terminal of FET 58. The drain terminal of FET 58 is connected to the D terminal while the source terminal of FET 58 is connected to terminal B and to one terminal of condenser C5. The remaining terminal of condenser C5 is connected to terminal E. As before, it is preferred that condensers C4 and C5 be electrets, thereby shortening the interrupt time.

It is to be understood that although only three variations of electronic components are shown, other variations may be utilized without departing from the spirit and scope of the present invention. For example, a standard ground fault interrupter circuit such as LM1851 Ground Fault Interrupter produced by National Semiconductor Corporation which are readily available and known to one skilled in the art may be utilized. Additionally, other types of mechanical interlocks may be utilized without departing from the spirit and scope of the present invention. Further, current interruption may be accomplished by replacing the electronic components and/or mechanical interrupt with other suitable current interrupting devices such as, for example, high current transistors latching relays, opto-isolators, and the like.

Accordingly, the present invention produces an extremely safe device for individuals to utilize which uses present design without the need for retooling and the like. Additionally, the present invention adds minimal cost while substantially increasing the safety of hand-held devices such as hair dryers and the like. Further, the present invention may be encompassed into other small appliances such as mixers, blenders and other kitchen-type aids.

Having thus described the present invention in detail, it is to be understood that the foregoing description is not intended to limit the spirit and scope thereof. What is desired to be protected by Letters Patent is set forth in the appended claims.

What is claimed is:

1. A safety device for an electrical device having an AC power supply for driving a load via a first electrical path, comprising:
   ground plane means disposed within said electrical device for providing an electrical ground path;
   electrical storage means for providing current through said ground plane means when said first electrical path is electrically connected to said ground plane means;
   current interruption means disposed within said electrical device for electrically disconnecting the AC power supply from the first electrical path;
   a first electret for providing a source of operating potential to said current interruption means; and
   switching means responsive to the current provided by said electrical storage means for electrically connecting said first electret to said current interruption means, whereby said current interruption means interrupts said first electrical path independently of the AC power supply.

2. A device according to claim 1, wherein said ground plane means is produced by plating the interior of said electrical device with an electrically conductive material.

3. A device according to claim 1, wherein said ground plane means is comprised of a metal foil conformally disposed in the interior of said electrical device.

4. A device according to claim 1, wherein said ground plane means is connected to any exposed electrically conductive parts in said electrical device.

5. A device according to claim 1, wherein said switching means is comprised of an FET having its gate connected to said electrical storage means, and its drain-source path connected serially between said current interruption means and said electret.

6. A device according to claim 1, wherein said electrical storage means includes a condenser.

7. A device according to claim 1, wherein said electrical storage means includes a battery.

8. A device according to claim 1, wherein said current interruption means includes a solenoid.

9. A device according to claim 8, wherein said solenoid is operatively connected to spring biased contacts, said spring biased contacts movable between a first position and a second position for respectively permitting and interrupting the flow of electrical current to a load in said safety device.

10. A device according to claim 9, further comprising a reset means operatively connected to said current interruption means for reestablishing the first electrical path in said electrical device.

11. A device according to claim 10, further comprising an aperture disposed within said electrical device adjacent to said reset means, said aperture permitting the insertion therethrough of a reset key adjacent to said solenoid for reestablishing the first electrical path in said electrical device.

12. A device according to claim 10, further comprising an aperture in a portion of said solenoid adjacent to said reset means, said aperture permitting the insertion therethrough of a reset key for reestablishing the first electrical path in said electrical device.

13. A device according to claim 2, wherein said electrical storage means is a second electret.

14. A safety device for an electrical device having a first electrical path for driving a load therein, comprising:
   ground plane means disposed within said electrical device for providing a ground path;
   current interruption means disposed within said electrical device for interrupting the first electrical path in said electrical device, said current interruption means including a solenoid that is operatively connected to spring biased contacts, said spring biased contacts being movable between a first position and a second position for respectively permitting and interrupting the flow of electrical current to the load in said safety device;
   biasing means disposed within said electrical device for operating said current interruption means, said biasing means including first electrical storage means for providing a source of operating potential to said solenoid, second electrical storage means for providing current through said ground plane means when said ground plane means is electrically connected to said first electrical path, and switching means responsive to the current provided by said second electrical storage means for electrically connecting said first electrical storage means to said solenoid, whereby said spring biased contacts are moved from their first position to their second position, causing the first electrical path to be interrupted; and
   reset means operatively connected to said solenoid for moving said spring biased contacts from their second position to their first position, a reset key for actuating said reset means, and an aperture disposed in said electrical device adjacent to said reset means for permitting the insertion therethrough of said reset key, whereby inserting said reset key through said aperture, the first electrical path in said electrical device is reestablished.

* * * * *